INVENTOR.
ROBERT E. McCLURE
BY
*Robert J. Haase*
ATTORNEY

United States Patent Office 3,448,406
Patented June 3, 1969

3,448,406
LASER FLUID FLOW SENSOR INSENSITIVE
TO ROTATION
Robert E. McClure, Locust Valley, N.Y., assignor to
Sperry Rand Corporation, a corporation of Delaware
Filed Apr. 5, 1966, Ser. No. 540,261
Int. Cl. H01s 3/05
U.S. Cl. 331—94.5          6 Claims The present invention generally relates to devices for measuring fluid flow without interfering with said flow and, more particularly, concerns a ring laser exclusively responsive to fluid flow.

As is wellu nderstood, each oscillatory mode of a so-called "ring" or closed loop resonant cavity laser comprises two beams of light which travel around the resonant cavity in opposite directions. Ordinarily and unless perturbed, the counterrotating waves form a degenerate set, each wave having exactly the same frequency. The degeneracy can be removed in a variety of ways, for example, by rotation of the ring-shaped cavity, by the use of a birefringent material positioned within the ring cavity and by motion of the medium through which the waves travel.

Ring lasers most often are employed to sense angular rotation rates about an axis passing through the plane of the resonant cavity. Rotating rate is determined by measuring the frequency difference between the counterrotating beams which frequency difference arises from the removal of degeneracy by angular rotation. The direction of angular rotation (clockwise or counterclockwise) can be determined through the expedient of a deliberately induced quiescent frequency separation between the counterrotating beams as described in patent application Ser. No. 328,326 for "Rotation Rate and Rotation Direction Sensing Ring Laser," filed Dec. 5, 1963, now Patent 3,382,758 issued May 14, 1968 in the name of Chao C. Wang and assigned to the present assignee.

In addition to angular rotation rate sensing, the ring laser is particularly well suited for the determination of fluid flow. For such an application, it is preferred that provision be made for eliminating the sensitivity of the ring to angular rotation in order that the frequency separation between the counterrotating beams exclusively represents fluid flow. This is especially important when the laser fluid flow sensor is intended for use on other than rigid and stable platforms or at varying locations at which varying or unknown frequency separations are produced by the rotation of the earth.

One object of the present invention is to provide a ring laser for sensing fluid flow wherein the degeneracy of the counterrotating beams is unaffected by ring rotation.

Another object is to provide a ring laser for sensing fluid flow with maximum sensitivity and efficiency.

These and other objects of the present invention, as will appear from a reading of the following specification, are accomplished in a preferred embodiment by the provision of a ring laser having a planar closed loop resonant cavity generally conforming in shape to the figure eight. That is, the resonant cavity comprises two closed loops wherein a given beam completes one traversal of the entire cavity by propagating first in a clockwise direction (about an axis normal to the plane of the cavity) through one of the loops of the figure eight and then by propagating in a counterclockwise direction through the other loop of the figure eight. The loops preferably are constructed with the same shape so as to enclose equal areas. A planar figure eight having equal areas enclosed by the two constituent loops has a zero total effective enclosed area. This results from the fact that in following the optical path around the entire resonant cavity, enclosed area to the left of the path can be considered positive area whereas enclosed area to the right of the path can be considered negative area. A zero total effective enclosed area makes the planar ring laser insensitive to rotation irrespective of the angle that the axis of rotation bears relative to the plane of the ring. An additional feature of the invention is that the figure eight configuration of the laser resonant cavity reduces to a minimum the reflection losses at the corner mirrors and provides for greater gain and greater sensitivity to fluid flow.

For a more complete understanding of the present invention, reference should be had to the following specification and to the figures of which:

Figure 1:
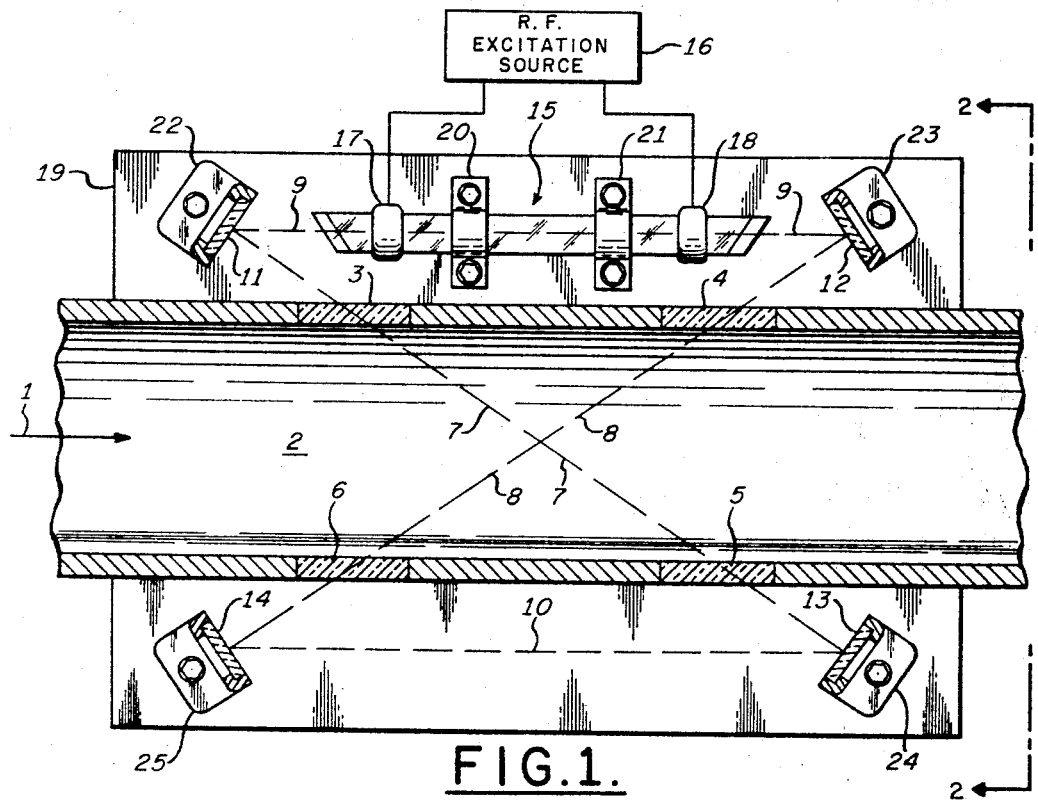
FIGURE 1 is a sectional view of a preferred embodiment.

Referring to FIGURE 1, a fluid whose flow is to be measured is represented by arrow 1 within pipe 2. The fluid 1 typically may be natural gas or oil, for example, whose flow is to be sensed for metering or regulatory purposes. Pipe 2 is equipped with four windows, 3, 4, 5 and 6, through which beams of light propagate along paths 7 and 8.

Paths 7 and 8 together with paths 9 and 10 comprise a resonant closed loop optical path which is completed by the four corner reflecting mirrors 11, 12, 13 and 14. Gas laser tube 15 is positioned along path 9 of the aforementioned resonant cavity. The active gas medium within tube 15 is pumped by radio frequency signals derived from R.F. excitation source 16 and applied via electrodes 17 and 18 mounted on tube 15. Tube 15 is mounted on plate 19 by clamps 20 and 21. Mirrors 11, 12, 13 and 14 also are mounted on plate 19 by clamps 22, 23, 24 and 25. Plate 19 is fixed to pipe 2. The counterrotating beams propagating within the resonant ring are extracted therefrom by partial transmission through one of the corner mirrors and are processed externally by means (not shown) which derive the frequency difference as shown in the aforementioned patent application.

In any closed ring resonant cavity within which counterrotating coherent beams of light propagate, the frequency difference between the counterrotating beams produced by rotation of the cavity about a given axis is given by the expression:

$$f = \frac{4\Omega S'}{\lambda P}$$

wherein $\Omega$ is the angular rotation rate, $S'$ is the projected area of the ring on a plane perpendicular to the axis of rotation, $\lambda$ is the wavelength of oscillations in the ring in the absence of ring rotation, and P is the perimeter of the ring. In traversing the complete path about a closed ring in order to determine the sign of the factor S', enclosed areas to the left of the path (relative to the direction of the path traversal) can be considered positive areas whereas enclosed areas to the right of the path can be considered negative areas. In the case of the disclosed embodiment and assuming that a complete traversal of the closed path is made in the direction of path segments 9, 7, 10 and 8, the triangular area bounded by path segments 9, 7 and 8 can be considered a "positive" area whereas the path bounded by segments 7, 10 and 8 can be considered a "negative" area. The two triangular areas togther constitute a planar closed loop optical path conforming in shape to the figure eight and having equal and "opposite" areas irrespective the axis about which the entire configuration might be rotated. There is, in effect, a zero effective projective area of the planar figure eight resonant cavity about any given axis of rotation. Consequently, the mode degeneracy of the two counterrotating light beams within the resonant cavity is not lifted irrespective of whatever rotation the entire configuration may be subjected to. Thus, the figure eight ring laser is totally insensitive to rotation.

Figure 2:
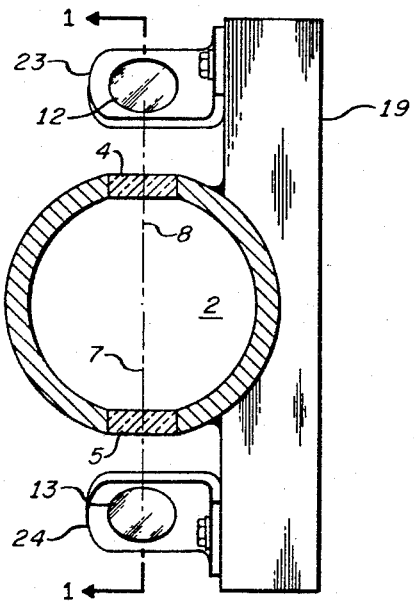
FIGURE 2 is an end view of said embodiment.
Figure 3:
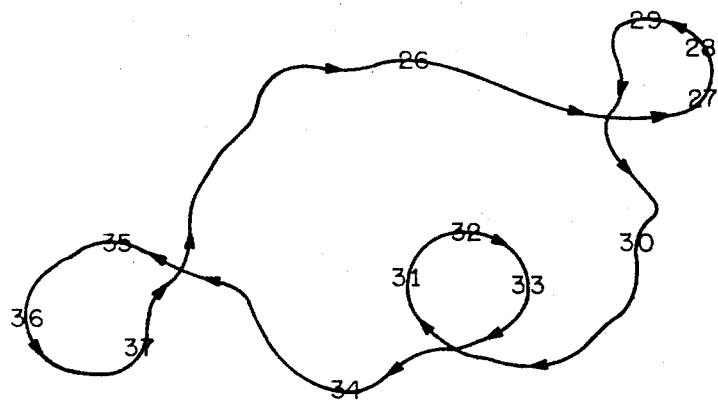
FIGURE 3 represents a generalized nonsymmetrical closed loop optical path demonstrating the principle of the present invention.

It should be noted that cavity shapes other than the simple symmetrical one shown in FIGURES 1 and 2 also will provide a zero effective projected area as defined above and possess concomitant insensitivity to rotation. For example, consider the generalized hypothetical closed loop optical path represented in FIGURE 3. The direction of the arrows indicates the direction that a beam of light would travel in traversing a complete circuit of said path. It should be noted that in the general case, the actual closed loop resonant cavity need not lie in a single plane. For the purpose of the following analysis, however, it is sufficient to consider the projection of the actual closed loop resonant cavity on a given plane. FIGURE 3 represents such a projection.

Figure 4:
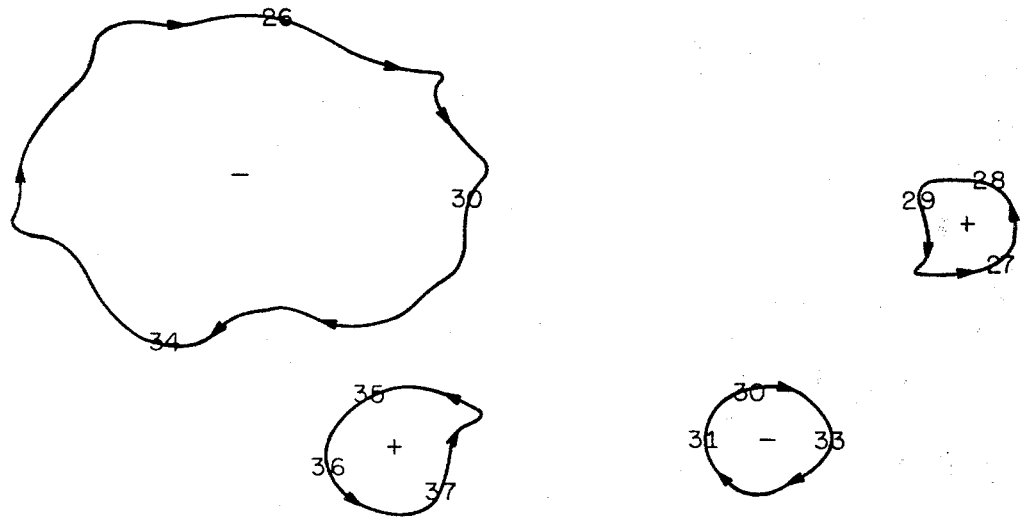
FIGURE 4 represents the component closed loops of the optical path of FIGURE 3.

In order that there be no sensitivity to rotation about an axis normal to a given plane, the present invention provides that the projection of the closed loop resonant cavity on the given plane comprises a plurality of component closed loops having a total perimeter equal to the perimeter of the projection of the closed loop resonant cavity on the given plane. In terms of FIGURE 3, the projection of the closed loop resonant cavity consists of the paths 26, 27, 28, 29, 30, 31, 32, 33, 34, 35, 36 and 37 which returns to 26 to complete the closed loop. The constituent component closed loops of FIGURE 3 are shown inn FIGURE 4. In the example given, there are four component loops, these being 26, 30, 34; 35, 36, 37; 31, 32, 33; and 27, 28, 29.

In accordance with the convention previously mentioned wherein enclosed areas to the left of the path (relative to the direction of the path traversal) can be considered positive areas and areas enclosed to the right of the path can be considered negative areas, each of the four constituent loops is designated with the appropriate + or − symbol. The total closed loop resonant cavity becomes insensitive to rotation about an axis perpendicular to the plane upon which the projection of FIGURE 3 is made in the event that the positive-designated component closed loops of FIGURE 4 have an area substantially equalling the area of the negative-designated component closed loops. It will be observed that the perimeter of the total closed loop resonant cavity projection is equal to the sum of the perimeters of the component closed loop projections inasmuch as no finite path length is shared between the component closed loop projections.

The figure eight ring laser represented in FIGURES 1 and 2 is sensitive, however, to the flow of fluid within pipe 2. One of the counterrotating beams of the figure eight ring laser (namely the one travelling in the direction of 9, 7, 10 and 8) travels in path segments 7 and 8 with a component of velocity in the same direction as that of fluid 1 whereas the other counterrotating beam travels in path segments 7 and 8 with a component of velocity in a direction opposite to that of fluid 1. Each of the two counterrotating beams is effected oppositely by the motion of the fluid 1 with the result that the frequency of the beam travelling in the same direction as the fluid is increased while the frequency of the beam travelling in a direction opposite that of the fluid is decreased. This is the well-known effect discussed on page 1148 of the paper Regenerative Oscillatory Multiple-Beam Interferometry for the Study of Light Propagation Effects by Adolph H. Rosenthal, Journal of the Optical Society of America, 52, Oct. 15, 1962.

Maximum frequency sensitivity of the counterrotating beams to the velocity of fluid 1 is achieved when the direction of the beams is the same as or opposite to the direction of fluid flow. Consequently, it is preferable that path segments 7 and 8 be inclined by a small acute angle relative to the axis of tube 2. The counterrotating beams would experience no frequency shift whatever in the event that path segments 7 and 8 were oriented at right angles to the axis of tube 2.

An important feature of the present invention is that increased sensitivity to fluid flow is achieved simultaneously with reduced losses encountered by the counterrotating beams within the optical resonant cavity. As discussed, fluid flow sensitivity is increased when path segments 7 and 8 make a small acute angle with the axis of tube 2. The smaller the angle between path segments 7 and 8 and the axis of tube 2, the smaller the angle between the incident and reflected beams at each of the four corner mirrors 11, 12, 13 and 14. Small angles between the incident and reflected beams reduce losses upon reflection at each corner mirror. Losses are increased substantially as the angle between the incident and reflected beams increases through obtuse angles.

It should be noted, however, that while it is advantageous for reasons of high mirror reflectivity and high flow sensitivity to make the angles of paths 7 and 8 as acute as possible with the axis of tube 2, it is also desirable that paths 7 and 8 enter and exit the windows 3, 4, 5 and 6 in pipe 2 at an angle of incidence equal to Brewster's angle. Light polarized in the plane of FIG. 1 will then traverse windows 3, 4, 5 and 6 without suffering reflection losses at said windows. If the cavity is shaped for Brewster angle incidence on said windows, the included angle between the incident and reflected rays on each of mirrors 11, 12, 13 and 14 will be approximately 34.4°, for example, when fused silica windows ($n=1.46$) are employed.

Not only does the figure eight configuration exhibit increased sensitivity to flow and reduced losses as the angle between path segments 7 and 8 and the axis of tube 2 is decreased, but the resulting increase in length of path segments 9 and 10 provides abundant space for the external location of laser tubes of required gain. The additional space is useful to provide whatever length of active material (hence gain) is required to overcome losses encountered by the counterrotating beams in propagating through optically dense fluids that may be flowing through pipe 2.

What is claimed is:
1. In a ring laser,
 a closed loop resonant cavity whose projection on a given plane comprises a plurality of component closed loops having a total perimeter equal to the perimeter of said cavity as projected on said plane,
 each said component loop enclosing an area of a sense depending upon which side said area lies relative to a given direction of traversal around said cavity as projected on said plane,
 at least one of said enclosed areas being of one sense and at least one other of said enclosed areas being of the opposite sense.
2. A closed loop resonant cavity as defined in claim 1 wherein the total enclosed areas of said one sense substantially equals the total enclosed areas of said opposite sense.
3. A closed loop resonant cavity as defined in claim 1 wherein each said closed loop is triangular in shape and contiguous with another triangular closed loop at a point.
4. A closed loop resonant cavity as defined in claim 3 wherein said projection on said given plane comprises two substantially identical triangular closed loops.
5. A device for sensing fluid flow comprising
 a conduit having an axis along which said fluid flow occurs,
 said conduit being transparent at a plurality of points to permit crossed light beams to propagate across said conduit at other than right angles relative to said axis,
 a ring laser having a closed loop resonant cavity com- prising two component triangular closed loops together conforming generally to the figure eight,
four sides of said two triangular closed loops constituting the optical paths for said crossed beams.

6. A device as defined in claim 5 wherein laser active material is positioned in at least one of the two sides of said two triangles other than the sides constituting said optical paths for said crossed beams,
said two sides of said two triangles being outside said conduit.

References Cited

UNITED STATES PATENTS

| | | | |
|---|---|---|---|
| 2,993,373 | 7/1961 | Kritz | 73—194 |
| 3,382,758 | 5/1968 | Wang | 331—94.5 |

JOHN KOMINSKI, *Primary Examiner.*

U.S. Cl. X.R.

73—194, 432